(12) United States Patent
Bienvenu

(10) Patent No.: US 8,617,766 B2
(45) Date of Patent: Dec. 31, 2013

(54) METHOD FOR CO-GENERATION OF ELECTRIC ENERGY AND HYDROGEN

(75) Inventor: Gerard Bienvenu, Viuz-en-Sallaz (FR)

(73) Assignee: Ergosup, Ville la Grand (FR)

( * ) Notice: Subject to any disclaimer, the term of this patent is extended or adjusted under 35 U.S.C. 154(b) by 184 days.

(21) Appl. No.: 13/387,582

(22) PCT Filed: Jul. 27, 2010

(86) PCT No.: PCT/FR2010/000546
§ 371 (c)(1),
(2), (4) Date: Jan. 27, 2012

(87) PCT Pub. No.: WO2011/015723
PCT Pub. Date: Feb. 10, 2011

(65) Prior Publication Data
US 2012/0121998 A1    May 17, 2012

(30) Foreign Application Priority Data
Jul. 30, 2009   (FR) ...................................... 09 03737

(51) Int. Cl.
*H01M 8/08* (2006.01)
(52) U.S. Cl.
USPC .............. 429/498; 429/500; 429/57; 205/343

(58) Field of Classification Search
USPC ............................................ 429/498, 500, 57
See application file for complete search history.

(56) References Cited

U.S. PATENT DOCUMENTS

| 4,345,980 A | 8/1982 | Chow et al. |
| 7,169,497 B2 | 1/2007 | Davis et al. |

FOREIGN PATENT DOCUMENTS

EP    2 048 110 A1    4/2009

OTHER PUBLICATIONS

Jacobsen et al., "Chemistry comes alive!" *Journal of Chemical Education*, vol. 3, pp. 1-6 1999.
International Search Report issued in International Application No. PCT/FR2010/000546 dated Dec. 3, 2010 (with translation).

*Primary Examiner* — Jane Rhee
(74) *Attorney, Agent, or Firm* — Oliff & Berridge, PLC

(57) ABSTRACT

A method for simultaneous co-generation of electric energy and hydrogen by totally electrochemical means which includes an electricity storage phase by electrolysis of an electrolysable metal solution and formation of a hydrogen-electrolysable metal battery cell and, an electricity recovery and hydrogen generation phase by operation of said battery cell. The electrolysable metal is chosen from zinc, nickel and manganese.

15 Claims, 2 Drawing Sheets

METHOD FOR CO-GENERATION OF ELECTRIC ENERGY AND HYDROGEN

BACKGROUND OF THE INVENTION

The invention relates to a method for simultaneous co-generation of electric energy and hydrogen by totally electrochemical means.

STATE OF THE ART

The development of the use of clean energies or smoothing of the electric energy from nuclear power plants has led to the development of storage systems based on mechanical systems such as water pumping and gas compression or electrochemical systems such as batteries and electrolysis of water.

The most commonly envisaged line is constituted by electrolysis of water, storage of hydrogen and recovery of the electric energy potentially contained in the hydrogen by fuel cells.

Although it is attractive in theory and on paper, such a line is confronted with extreme technological difficulties concerning both electrolysers and fuel cells which constitute technological wonders but which are very onerous, as all wonders are.

Although fuel cells uncontestably present a great interest, they will on the other hand be reserved for very specific applications on account of their cost and their efficiency.

If the mean values of the efficiencies of electrolysis of water and of fuel cells are taken and taking into account that the compression of hydrogen is today the most widespread industrial method for storing this gas, it can be seen that only 25 to 30% at best of the initial electric energy is restored.

A notable improvement can be made at storage level by fixing the hydrogen in the form of hydrides and more particularly of magnesium hydride.

From the technical standpoint, all electrochemists know that operating an electrolysis cell or a fuel cell with two gas-based electrodes is complex and delicate. Furthermore, the polarizations at the electrodes are high except if catalysers are used, but in this case investments are heavily penalized.

It is further known to use electrolysis of zinc to produce hydrogen. For example, the document U.S. Pat. No. B-7,169,497 and the article by J. J. Jacobsen et al. (J. Chem. Educ. Software, vol. 3, 1999-09-01) can be cited. In particular, J. J. Jacobsen et al. describe different zinc/hydrogen battery cells in a hydrochloric acid medium in particular using copper and nickel cathodes to generate electricity and hydrogen.

Let us further recall that batteries constitute the only reversible systems capable of storing and restoring electricity but that they are impacted by efficiencies on charge and discharge that are multiplied and their production cost is in general high, being situated for quality-performance batteries between 260 and more than 1,000 €/kWh as against 30 to 130 €/kWh for lead batteries.

The capacities of these batteries are comprised between 30 and 100 Wh/kg.

The high capacity values are those of lithium, nickel/zinc and sodium/sulphur batteries. They all have practical capacities comprised between 80 and 100 W/kg, but only the nickel/zinc battery is realistic from the economic standpoint for high storage capacities, as lithium and sulphur systems present numerous technological drawbacks with the consequence of high risks related to the reactivity of lithium and of sodium and to the fragility of the solid electrolyte (β alumina), with in addition for the sodium and sulphur battery an operation in liquid state at high temperature (~300° C.).

Unlike fuel cells, batteries contain their active material which makes them heavier.

Let us however add that batteries have for the most part been studied for mobile applications whereas fixed storage is not governed by the same imperatives.

OBJECT OF THE INVENTION

The object of the invention is to simultaneously produce electric energy and hydrogen by means of a method remedying the drawbacks of the prior art.

In particular, the object of the invention is to propose a method for simultaneous co-generation of electric energy and hydrogen that is cost effective, clean and provides flexibility of use for optimized production.

According to the invention, this object is achieved by a method for simultaneous co-generation of electric energy and hydrogen by totally electrochemical means that comprises:
 a phase of electricity storage by electrolysis of a electrolysable metal solution and formation of a hydrogen-electrolysable metal cell and,
 an electricity recovery and hydrogen generation phase by operation of said cell, said electrolysable metal being chosen from zinc, nickel and manganese.

BRIEF DESCRIPTION OF THE DRAWINGS

Other advantages and features will become more clearly apparent from the following description of particular embodiments of the invention given for non-restrictive example purposes only and represented in the appended drawings, in which.

DESCRIPTION OF PARTICULAR EMBODIMENTS

A method for simultaneous co-generation of electric energy and hydrogen by totally electrochemical means comprises:
 a phase of electricity storage by electrolysis of an electrolysable metal solution and formation of a hydrogen-electrolysable metal cell and,
 an electricity recovery and hydrogen generation phase by operation of said cell.

The present invention is essentially suitable for fixed storage of electricity. It is the result of a fortuitous reflection on the energy contents of metals and their ability to produce hydrogen by acid or alkaline attack, combined with the efficiency and simplicity of their recycling.

From among all the possible metals, we opted in preference for zinc which is the most common and above all the easiest to recycle industrially. Other metals can also be envisaged such as nickel or manganese. Aluminium and magnesium were rejected in spite of their high reactivity and their high energy content as recycling of the latter can only be performed by electrolysis in fused salt baths or by metallothermy or carbothermy at high-temperature. The choice of such metals makes implementation more complex and significantly increases the production cost.

The electrolysable metal is therefore chosen from zinc, nickel and manganese.

A device for implementation of the method for co-generation of electric energy and hydrogen comprises:
- a first electrolysis cell provided with at least a first anode and a first cathode, the first cell being able to form an electrolysable metal on the first cathode by releasing oxygen and,
- a second cell operating as an electric battery cell provided with at least a second anode and a second cathode, the second cell enabling re-dissolution of the metal on the second anode.

The first and second cells can form a single cell or two distinct and separate cells in fluidic and electric communication.

In both cases, the device is produced in such a way as to capture the emitted gases, i.e. oxygen in the optimal storage phase and hydrogen in the electricity recovery phase.

Figure 1:
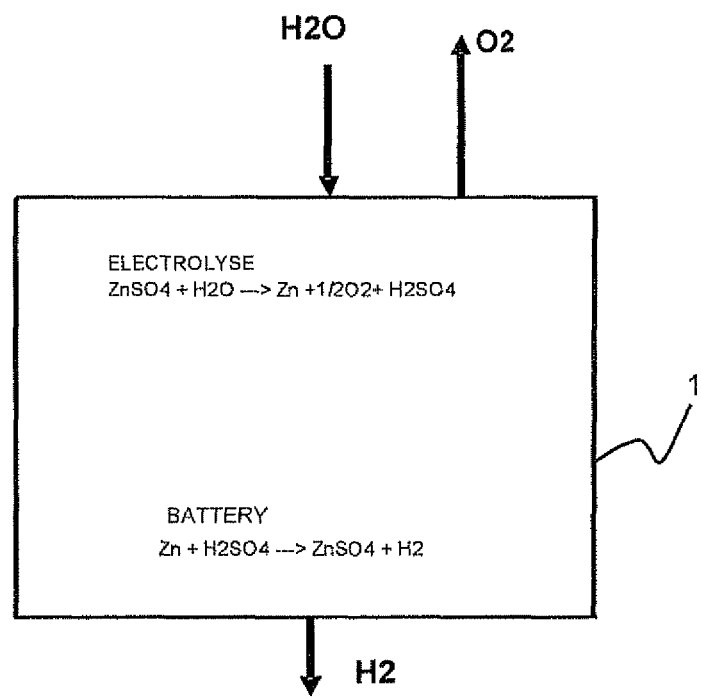
FIG. 1 schematically represents a device for implementation of a method for simultaneous co-generation of electric energy and hydrogen according to a first particular embodiment of the invention.

According to a first particular embodiment represented in FIG. 1, the first and second cells are formed by a single cell 1. The first embodiment is based on a device for electrolysis of zinc having reversible operation as an electric battery cell.

The first cathode and the second anode form a single electrode which alternately acts as cathode in the storage phase and as anode in the recovery phase.

Likewise, the first anode and the second cathode form a single electrode which alternately acts as anode in the storage phase and as cathode in the recovery phase.

The first electrolysis cell is thus advantageously also used as a battery cell.

The electrolysable metal is advantageously zinc.

The method for simultaneous co-generation of electric energy and hydrogen by totally electrochemical means comprises a first phase of formation of a zinc-hydrogen battery cell by electrolysis of a zinc solution. The first phase enables electricity to be stored in the form of a zinc deposit on the first cathode.

The zinc solution is an electrolytic solution formed by a pure solution of zinc sulphate with a content of 150 to 200 g/l of zinc at pH 4.5, to have a ratio ρ of the acid and zinc concentrations that is as low as possible at the beginning of electrolysis. The ratio ρ is equal to the following equation:

$$\rho = \frac{[CH_2SO_4]}{[(ZnSO)_4]}$$

The electrolysis reaction (1) represented below takes place in single cell 1:

$$ZnSO_4 + H_2O \rightarrow Zn + \tfrac{1}{2}O_2 + H_2SO_4 \quad (1)$$

As represented in FIG. 1, single cell 1 comprises at least two electrodes and is hermetically sealed. Single cell 1 also comprises an inlet for the water feed and two outlets—a first outlet for oxygen and a second outlet for hydrogen.

In this device, single cell 1 is totally suitable for storage of electricity. In comparison with well-known industrial zinc production cells, the differences are numerous and essential i.e.:

Electrode Materials

In single cell 1, at least one copper electrode and/or at least one electrode made from a metal unable to be attacked by oxygen in an acid environment are used.

In the storage phase, the lead of the anode is replaced by an anode made from a metal unable to be attacked by oxygen in an acid environment. We privileged titanium nitride at the surface or even better a "sandwich" type electrode with a copper core and a titanium nitride envelope. A surface-chromed copper electrode can advantageously be used with or without superficial nitridation of the chrome. An anode made from titanium nitride, chromed copper or chromed and nitrified copper is therefore advantageously used in the storage phase of the method.

Aluminium, which conventionally forms the cathode in electrolysis of zinc due to the non-adherence of zinc on aluminium, is replaced by a copper cathode. The zinc deposits in fact do not have to be removed in the method according to the invention.

With such electrodes, ohmic losses are greatly reduced.

The electrode, in particular the anode, can also be activated by depositing traces of depolarizing metals such as platinum thereon.

The inter-electrode distances, which are from 3 to 3.5 cm in zinc production, are reduced here to 4 to 6 mm, which considerably reduces ohmic losses.

Let us recall that in an industrial zinc electrolysis cell for a current density of 520 A/m² an efficiency of about 60% is obtained.

By reducing the current density to 400 A/m², the efficiency of industrial cells increases to 64%, and in the embodiment according to the invention, with an inter-electrode distance of 5 mm and a current density of 400 A/m², the efficiency reaches 83% and even 90% for a current density of 300 A/m².

Figure 2:
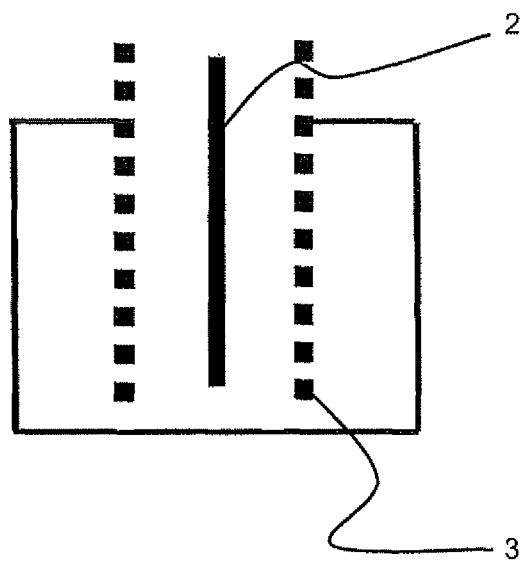
FIG. 2 schematically represents a single cell of the device according to FIG. 1.

As an example represented in FIG. 2, single cell 1 has a copper electrode and two titanium nitride electrodes facing the latter. In the storage phase, the copper electrode forms first cathode 2 having a back-and-front surface of 2 dm² and the titanium nitride electrodes form two first anodes 3.

First cathode 2 with length and width dimensions respectively of 1 dm×1 dm is supplied for 8 hours by means of a stabilised power supply.

In the storage phase, a zinc-hydrogen battery cell is formed. Electrolysis forms a zinc deposit on first cathode 2 of the zinc-hydrogen battery cell.

The electrolysis results are given in the following table (1).

TABLE 1

| Electrolysis | |
| --- | --- |
| Time (hours) | 8 |
| Cathode surface (dm2) | 2 |
| Current density (A/dm2) | 4 |
| Quantity of current (Cb) | 230400 |
| Quantity of zinc calculated (g) | 78 |
| Quantity of zinc obtained (g) | 77.2 |
| $\rho_f$ | 0.99 |
| Mean voltage (volts) | 2.57 |
| E (J) | 592128 |
| Theoretical E (J) | 470016 |
| $\rho_e$ | 0.79 |
| Quantity of electrolyte (l) | 2 |
| Initial quantity of zinc (g) | 300 |
| Final quantity of zinc (g) | 223 |
| H2SO4 (g/l) | 60 |

In table 1, $\rho_f$ represents the faradic efficiency and $\rho_e$ the energy efficiency.

Table (2) given below sets out the results of comparison of conventional electrolysis with that of electrolysis according to a particular embodiment of the invention.

TABLE 2

COMPARISON OF PERFORMANCES

|  | Conventional electrolysis | | Storage electrolysis | |
|---|---|---|---|---|
| I (A/m2) | 400 | 526 | 400 | 600 |
| W (Kwh/t) | 3200 | 3420 | 2024 | 2253 |
| E° (Volts) | 2.04 | 2.04 | 2.04 | 2.04 |
| E (Volts) | 3.2 | 3.47 | 2.47 | 2.75 |
| R (ohms) | 0.0014 | 0.0014 | 0.0002 | 0.0002 |
| $R_i$ (Volts) | 0.5703 | 0.7500 | 0.08 | 0.12 |
| ρ | 0.59 | 0.86 | 0.35 | 0.59 |
| $ρ_e$ | 0.64 | 0.59 | 0.83 | 0.74 |

The first storage phase is followed by a second electricity recovery and hydrogen generation phase. The cell operates as soon as electrolysis is stopped to produce electricity and hydrogen.

In the electricity recovery and hydrogen generation phase, the following reaction (2) takes place:

$$Zn + H_2SO_4 \rightarrow ZnSO_4 + H_2 \quad (2)$$

Deposition of the zinc formed in the storage phase is consumed in the electricity recovery phase to regenerate the zinc sulphate solution necessary for the storage phase.

A free enthalpy release of −217,000 joules takes place at 40° C. generating a potential difference of 1.12 volts under zero current.

Thus, on completion of electrolysis, power supply is stopped and the poles of single cell 1 are connected to a resistance of 0.2Ω. A mean of 3.55 A is thus debited during 8 hours under a voltage that varies between 1.05 volt and 0.6 volt, for a mean value of 0.78 volt.

Table (3) represented below sets out the results of the electricity recovery and hydrogen generation phase.

TABLE 3

ENERGY RECOVERY

| | |
|---|---|
| Time (hours) | 8 |
| Cathode surface (dm2) | 2 |
| Mean Current density (A/dm2) | 3.55 |
| Quantity of current (Cb) | 230040 |
| Quantity of zinc dissolved (g) | 76.4 |
| $ρ_f$ | 0.98 |
| Mean voltage (volts) | 0.78 |
| E (J) | 179431 |
| Theoretical E (J) | 254545 |
| $ρ_e$ | 0.7 |
| Quantity of electrolyte (l) | 2 |
| Initial quantity of zinc (g) | 223 |
| Final quantity of zinc (g) | 299.4 |
| H2SO4 (g/l) | 2.8 |
| Quantity of hydrogen (litres) | 29 |

The global balance is therefore established as follows:

| | |
|---|---|
| Total energy consumed | 592,128 joules |
| Total energy recovered | 179,431 joules |
| Hydrogen production | 2.33 grams | which gives a consumption of 412,696 joules for 2.33 g or 177,123 joules/g expressed in kWh/kg which amounts to 49.2.

As 31.53 kWh are theoretically required to produce 1 kg of hydrogen, a global efficiency of 64% was obtained.

The value of this efficiency is quite comparable or even higher than that of existing electrolysers. It should however been noted that this result is obtained with a view to storing electric energy in off-peak hours and that this energy is restored to the extent of 30% in the form of electric energy accompanied by production of 1 kg of hydrogen for 70 kWh electric stored.

Knowing that combustion of a kilogramme of hydrogen in a gas turbine gives off 34.7 kWh thermal and that the efficiency of such a turbine reaches a figure of at least 40%, it can be estimated that such a line is capable of recovering 50% of the stored electric energy.

Figure 3:
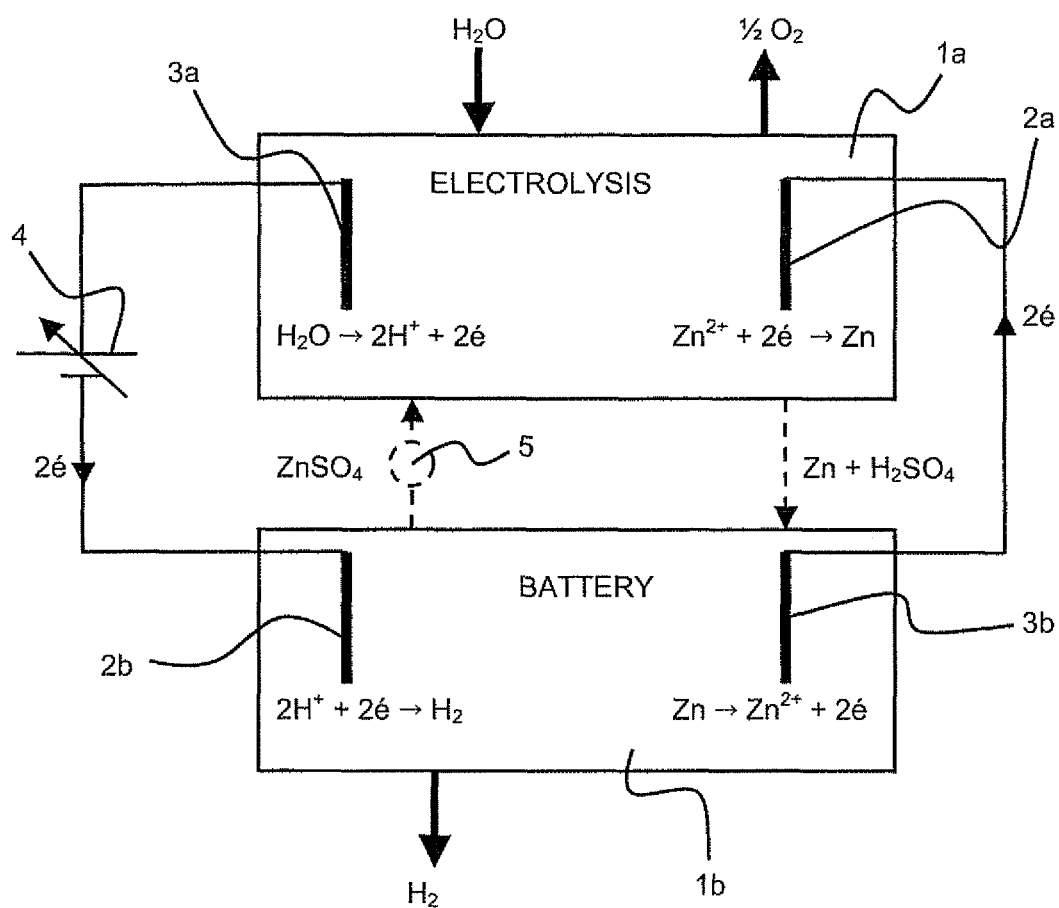
FIG. 3 schematically represents, in cross-section, a device for implementation of a method for simultaneous co-generation of electric energy and hydrogen according to a second particular embodiment of the invention.

According to a second particular embodiment represented in FIG. 3, the storage phase and the electricity recovery and hydrogen generation phase are performed simultaneously to achieve continuous production of hydrogen. Electrolysis is performed in a first electrolysis cell 1a and co-generation is performed in a second cell 1b different from first electrolysis cell 1a.

As represented in FIG. 3, the device is identical to the first particular embodiment with the exception of the fact that the device comprises a distinct and separate first electrolysis cell 1a and second cell 1b in fluidic and electric communication.

The device operates in continuous manner for continuous production of hydrogen.

First cell 1a is provided with a first cathode 2a and with a first anode 3a.

Second cell 1b is provided with a second cathode 2b and with a second anode 3b.

Each of the first and second cathodes, respectively 2a and 2b, and the first and second anodes, respectively 3a and 3b, operate on a single surface, the other surface being insulated.

The first and second cells, respectively 1a and 1b, are electrically connected to a stabilised power supply 4.

The electrolyte flows from first cell 1a to second cell 1b by gravitation and from second cell 1b to first cell 1a by means of a diaphragm pump 5 (dashed arrows in FIG. 3).

For example purposes, cathodes 2a and 2b and anodes 3a and 3b have an active surface of 1 dm².

First and second cathodes 2a and 2b are made from copper and first and second anodes 3a and 3b are made from titanium nitride. For an operating time of 2 hours, the current density obtained reaches a value of 4 A/dm² with a zinc concentration of 1.45 g/l at a pH of 4.

The measured mean voltage is 1.7V at the terminals of power supply 4.

9.68 g of zinc coming from first cell 1a was dissolved in second cell 1b. 3.6 liters of hydrogen and 1.78 liters of oxygen were also recovered.

The energy consumption is 13.6 Wh corresponding to 47 Wh/kg of $H_2$.

The great advantage of the method according to the invention resides in its economy and the simplicity of the technology.

The technology of zinc electrolysis cells that are either conventional or adapted for this application does in fact enable investments to be obtained without common measure with those required for electrolysis of water.

The method according to the invention is also remarkable in that it enables electric energy available at a time T, for example in off-peak hours, to be stored, and the stored electric energy to be restored with a high efficiency, for example in peak hours.

The invention claimed is:

1. A method for simultaneous co-generation of electric energy and hydrogen comprising:
providing a solution of an electrolysable metal choosen from Zn, Ni and Mn, a first electrode and a second electrode, electrolysing the solution so as to:
deposit the electrolysable metal on the first electrode,
generate aqueous hydrogen in the solution at the second electrode,
and form a hydrogen-electrolysable metal cell,
operating the hydrogen-electrolysable metal cell so as to simultaneously:
produce gaseous hydrogen from the aqueous hydrogen at the second electrode,
oxidize the electrolysable metal from the first electrode,
and generate electric energy between the first and the second electrodes.

2. The method according to claim 1, wherein the electrolysable metal solution is an acid solution.

3. The method according to claim 1, wherein the cell is configured so as to collect the gaseous hydrogen.

4. The method according to claim 1, wherein an electrolysis cell is used as battery cell.

5. The method according to claim 4, wherein the cell is hermetically sealed.

6. The method according to claim 4, wherein the electrolysable cell has a reversible operation as battery cell.

7. The method according to claim 1, wherein the electrolysis is performed in a first electrolysis cell and co-generation is performed in a second cell different from the first electrolysis cell.

8. The method according to claim 7, wherein the first cell comprises a first cathode and a first anode and the second cell comprises a second cathode and a second anode.

9. The method according to claim 7, wherein the first and second cells are configured so as to achieve continuous production of hydrogen.

10. The method according to claim 1, wherein at least one copper electrode is used.

11. The method according to claim 1, wherein at least one electrode made from metal unable to be attacked by oxygen in an acid environment is used.

12. The method according to claim 1, wherein a titanium nitride anode is used in the storage phase of said method.

13. The method according to claim 1, wherein a chromed copper anode is used in the storage phase of said method.

14. The method according to claim 1, wherein a chromed and nitrided copper anode is used in the storage phase of said method.

15. The method according to claim 1, wherein an electrode is activated by depositing traces of depolarizing metals such as platinum thereon.

* * * * *